(12) United States Patent
Matsumoto et al.

(10) Patent No.: US 6,172,605 B1
(45) Date of Patent: Jan. 9, 2001

(54) REMOTE MONITORING SYSTEM AND METHOD

(75) Inventors: Takashi Matsumoto, Aichi-ken; Tsutomu Kumazaki, Gifu-ken, both of (JP)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 09/108,377

(22) Filed: Jul. 1, 1998

(30) Foreign Application Priority Data

Jul. 2, 1997 (JP) .................................................. 9-177029

(51) Int. Cl.⁷ .................................................. G08B 23/00
(52) U.S. Cl. .......................... 340/500; 340/531; 340/541; 348/143; 348/152
(58) Field of Search .................................... 340/541, 540, 340/500, 286.02, 531, 533; 348/7, 143, 152, 154–156

(56) References Cited

U.S. PATENT DOCUMENTS

| | | | |
|---|---|---|---|
| 5,512,942 | * 4/1996 | Otsuki | 348/143 |
| 5,592,401 | 1/1997 | Kramer | 702/153 |
| 5,602,749 | 2/1997 | Vosburgh | 700/174 |
| 5,657,003 | 8/1997 | Fuentes | 340/690 |
| 5,666,157 | * 9/1997 | Aviv | 348/152 |
| 6,028,626 | * 2/2000 | Aviv | 348/152 |

FOREIGN PATENT DOCUMENTS

| | | |
|---|---|---|
| DE 42 41 006 A1 | 6/1994 | (DE) . |
| 40889 | 2/1993 | (JP) . |
| 288510 | 10/1995 | (JP) . |
| 111859 | 4/1996 | (JP) . |
| 124065 | 5/1996 | (JP) . |

OTHER PUBLICATIONS

Pat. Abstracts of Japan, vol. 1997, No.5, May 1997, JP 09027952.

* cited by examiner

Primary Examiner—Thomas Mullen
(74) Attorney, Agent, or Firm—McDermott, Will & Emery

(57) ABSTRACT

The present invention concerns a remote monitoring system and method. In the monitoring terminal unit 10, a TV camera 11 pictures a monitoring object and a sensor 18 watches for any abnormality in the monitoring object. The monitoring images from the TV camera 11 is encoded in the resolution set in an encoder 12. The encoded image data is continuously written in an image storage 14 in a cyclic way. In addition, real-time images pictured by the TV camera or stored images are transmitted to the monitoring central unit 20 via connection control unit 132 only when an abnormality is detected. The monitoring central unit 20 displays on the monitor 27 the images thus sent in. In that remote monitoring system, the resolution to give to the image encoder 12 is fixed at a constant value in the normal state and is raised to a higher value than normal in case of abnormality. That permits watching the monitoring object in a high resolution.

16 Claims, 9 Drawing Sheets

REMOTE MONITORING SYSTEM AND METHOD

FIELD OF THE INVENTION

The present invention relates to a remote monitoring system and method for supervising a remotely located object utilizing a communication line.

BACKGROUND OF THE INVENTION

In the remote monitoring system, the monitoring central unit used to be kept in constant touch with the monitoring terminal unit. In recent years, that old system has been replaced with a new one which connects the monitoring terminal unit with the monitoring central unit only when necessary to save the maintenance costs such as communication expenses.

The prior art to the present invention is explained hereinafter.

FIG. 8 shows a block diagram of the remote monitoring system in the prior art. The monitoring image or the output of the TV camera 101 of the monitoring terminal unit 100 is inputted into an encoder 102, where the image is encoded and the image data volume is compressed. The monitoring image thus encoded is referred to an image storage 104 for storage through a terminal control 103.

If the sensor 106 detects something abnormal, the terminal control 103 will activate a communication control 105 to get in touch with the monitoring central unit 200. When that connection is established with the monitoring central unit 200, the monitoring image data stored in the image storage 104 will be sent out successively starting with that of before or after the detection of the abnormality.

The monitoring central unit 200 first stores in an image holder 202 the monitoring image data sent from the monitoring terminal unit 100 through a communication control 201. The image data is then decoded in the decoder 203 and the delayed monitoring image is displayed on a monitor 206. This monitoring image is stored in the image holder 202 and can be reproduced at any time. Another feature is that if the current monitoring data is needed instead of the one stored in the image storage 104, real-time monitoring data can be obtained on the monitoring central unit 200.

In the remote monitoring system of the prior art, the monitoring image obtained in the monitoring central unit 200 is either the real-time image data from the moment of the connection or the delayed image data stored in the monitoring terminal unit 100 before or after the detection of an abnormality.

The prior art system provided the following problem, however: On a real-time basis, it is impossible to get image data before or after the detection of an abnormality which is necessary for tracing the cause thereof, while delayed image data is not a real-time one and is not timely especially in case of emergency. Another shortcoming is that since image data being transmitted is fixed or constant in resolution, there is a possibility that useful monitoring images may not be obtained if the communication service is low in quality. Furthermore, in case there is an interruption in the communication because of some trouble with the communication line, the monitoring image data will be lost up to the moment that the connection is restored.

The present invention is proposed in the light of those shortcomings of the prior art.

SUMMARY OF THE INVENTION

It is an object of the present invention to provide a remote monitoring system which permits real-time supervision from the monitoring central unit and the tracing of the cause of an abnormality using high resolution image data starting at the moment of its detection and, even in case of failure to set up a connection with the monitoring central unit or an interruption in the communication, continues to store the minimum monitoring image data required and send out the same voluntarily or in answer to a request from the monitoring central unit.

To achieve the foregoing objects, the present invention adopts the means described hereinafter on the following remote monitoring system which forms the basis thereof. The system is provided with a monitoring terminal unit and a monitoring center.

The monitoring terminal unit is provided with a TV camera which pictures a monitoring object and a sensor which watches out for any abnormality in the condition of the object. The monitoring object's image data from the TV camera is encoded at a resolution set in an encoder. The encoded image data is written in an image storage continuously in a cyclic manner. Furthermore, it is so arranged that only when an abnormality is detected, a stream of real-time images pictured by the TV camera will be transmitted to the monitoring central unit via connection control means. The monitoring central unit displays on the monitor the images as they are sent in. The present invention is built on that remote monitoring system. And the following means or improvements are adopted on that system. The remote monitoring system as set forth above is provided with an encoding control means which so regulates the resolution to give to the encoder as to be constant in case of the normal state in the monitoring object and to be higher in value than normal in case of abnormality.

Also, the encoding control means gradually lowers the resolution given to the encoder at the time of abnormality down to the level—the resolution level in the normal state for real-time images which are transmitted after a connection is made with the monitoring central unit—in such a way that the normal-state resolution $D_0$ level is reached at the preset time $t_1$. The preset time $t_1$ is the time when the connection is expected to be completed, and this preset time is inputted in the connection control means in advance.

In case a connection with the monitoring central unit can not be established by the end of a specific resolution adjusting period $T_0$ before and after the predicted time $t_1$ of completion of the connection during which the resolution is maintained at the same level as that for real-time image, the encoding control means will gradually lower the resolution from the real-time image level until the connection time-out point $t_{30}$. At this connection time-out point $t_{30}$, it is regarded that the attempt to set up a connection with the monitoring central unit has failed. So, the writing in of image data can be prolonged up to the capacity of the image storage.

It is also possible to provide the connection control means with a function which will try again to establish communication with the monitoring central unit when an attempt to get a connection fails. The trial can be repeated a preset number of times at a preset interval.

It is also so configured that the monitoring terminal unit is provided with a data multiplexer which multiplexes real-time image data outputted by the encoder and stored data from the image storage. That enables the monitoring central unit to simultaneously display image data stored in the image storage and real-time image data outputted from the TV camera by the encoder. In this monitoring central unit, in addition, a data separator separates the multiplexed image data sent in from the monitoring terminal unit. An image holder then stores the real-time image data outputted from the data separator and the stored image data respectively. Respective outputted data from the image holder are decoded at the decoder, and then the real-time images and the stored images are displayed on the monitor simultaneously or separately.

It is also so arranged that a memory control means is set for a specific time before or after the moment $t_0$ of detection of an abnormality and a stream of stored data to be read out from the image storage 14 can be limited to that set time.

Still another possible arrangement is that if the memory control means finishes writing image data in the image storage when the connection with the monitoring central unit is completed, the aforesaid stored data can be transmitted repeatedly on a request made by the monitoring central unit. Also, in case the writing in still continues after the connection with the monitoring central unit is completed, the image data from the image storage can be transmitted as delayed image data along with the real-time image data.

In case the communication between the monitoring terminal unit and the monitoring central unit is interrupted because of some trouble, the memory control means can transmit the stored data before and after the break of the communication along with the real-time image data when the connection with the monitoring central unit is re-established.

It is also so arranged that the monitoring central unit is provided with a memory control means which controls the read-out of image data that can reproduce a stream of monitoring images before and after the moment $t_0$ of detection of abnormality by putting together the stored image data stored in the image storage and the real-time image data.

It is also possible to so configure that the monitoring central unit is provided with an input control means which inputs control information in the monitoring terminal unit so that the resolution of image and the number of frames can be changed.

EMBODIMENTS OF THE INVENTION

Figure 1:
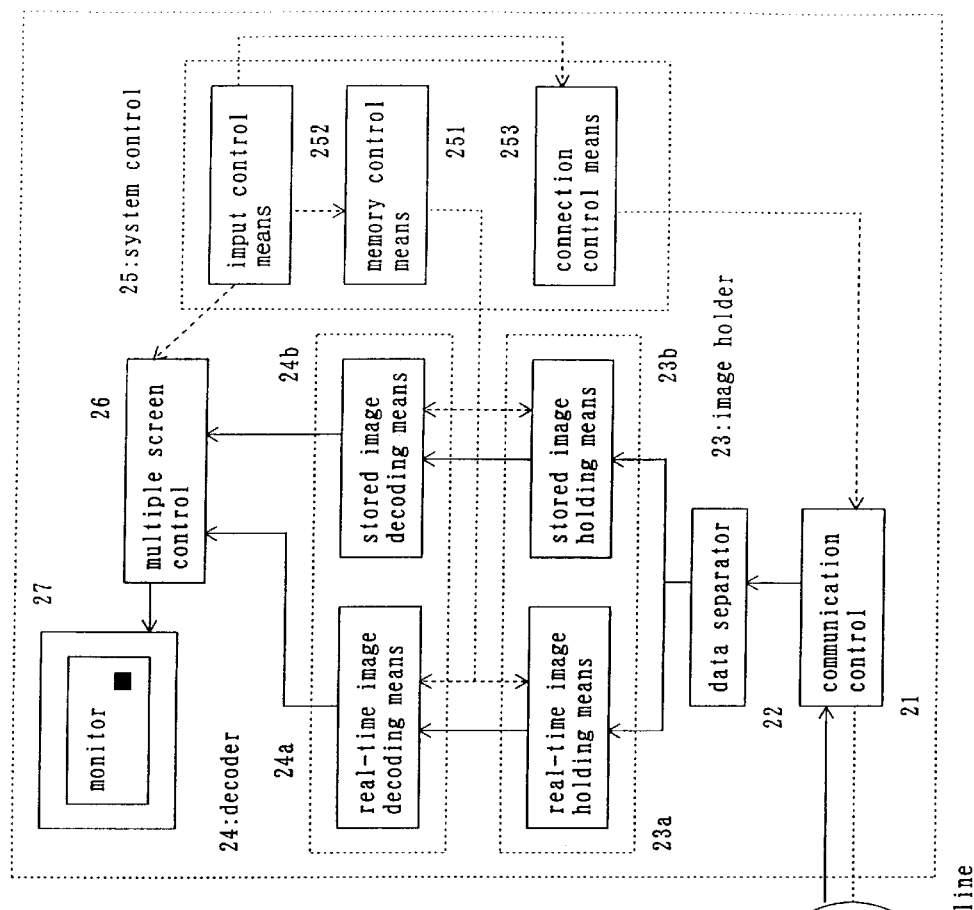
FIG. 1 shows a block diagram of the remote monitoring system in an embodiment of the present invention.
Figure 1:
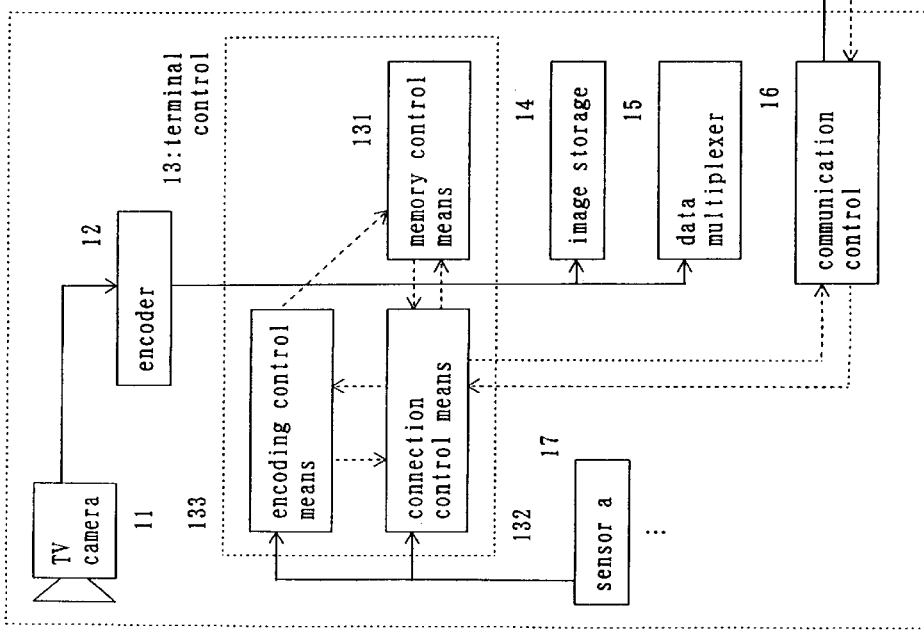
Figure 2:
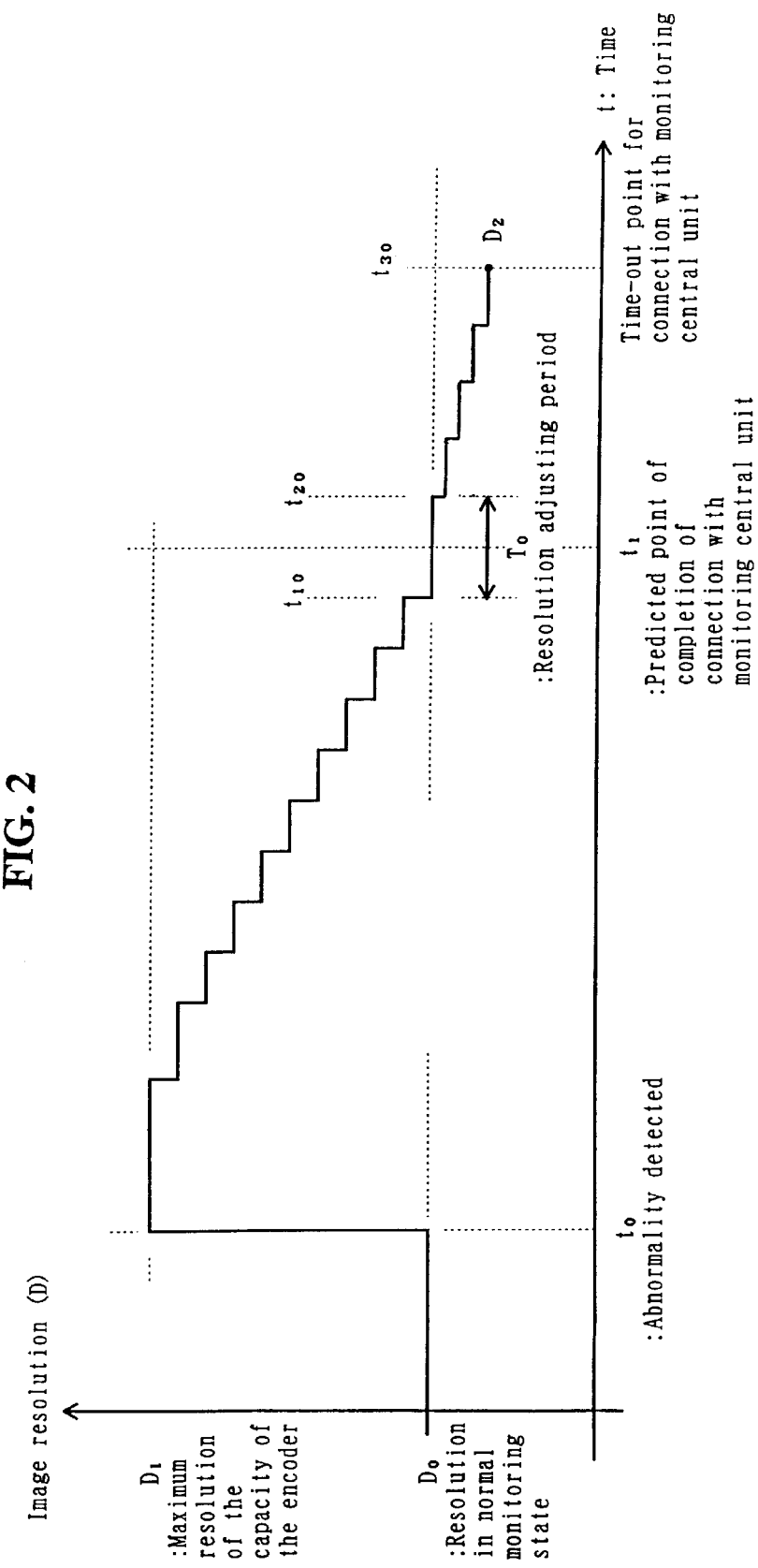
FIG. 2 shows a graph of a change in resolution in encoding image data in an embodiment of the present invention.
Figure 3:
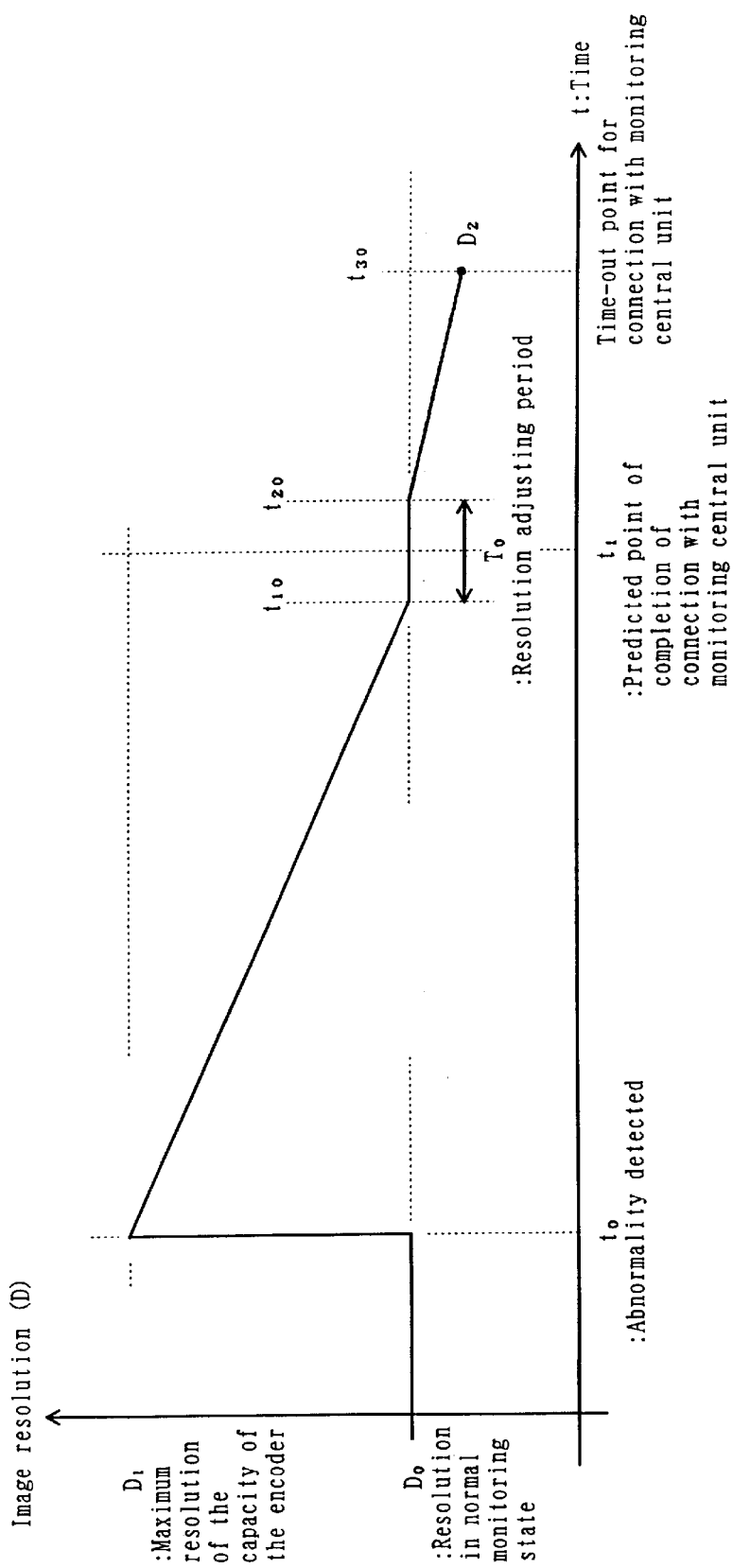
FIG. 3 shows a graph of a change in resolution in encoding image data in another embodiment of the present invention.
Figure 4:
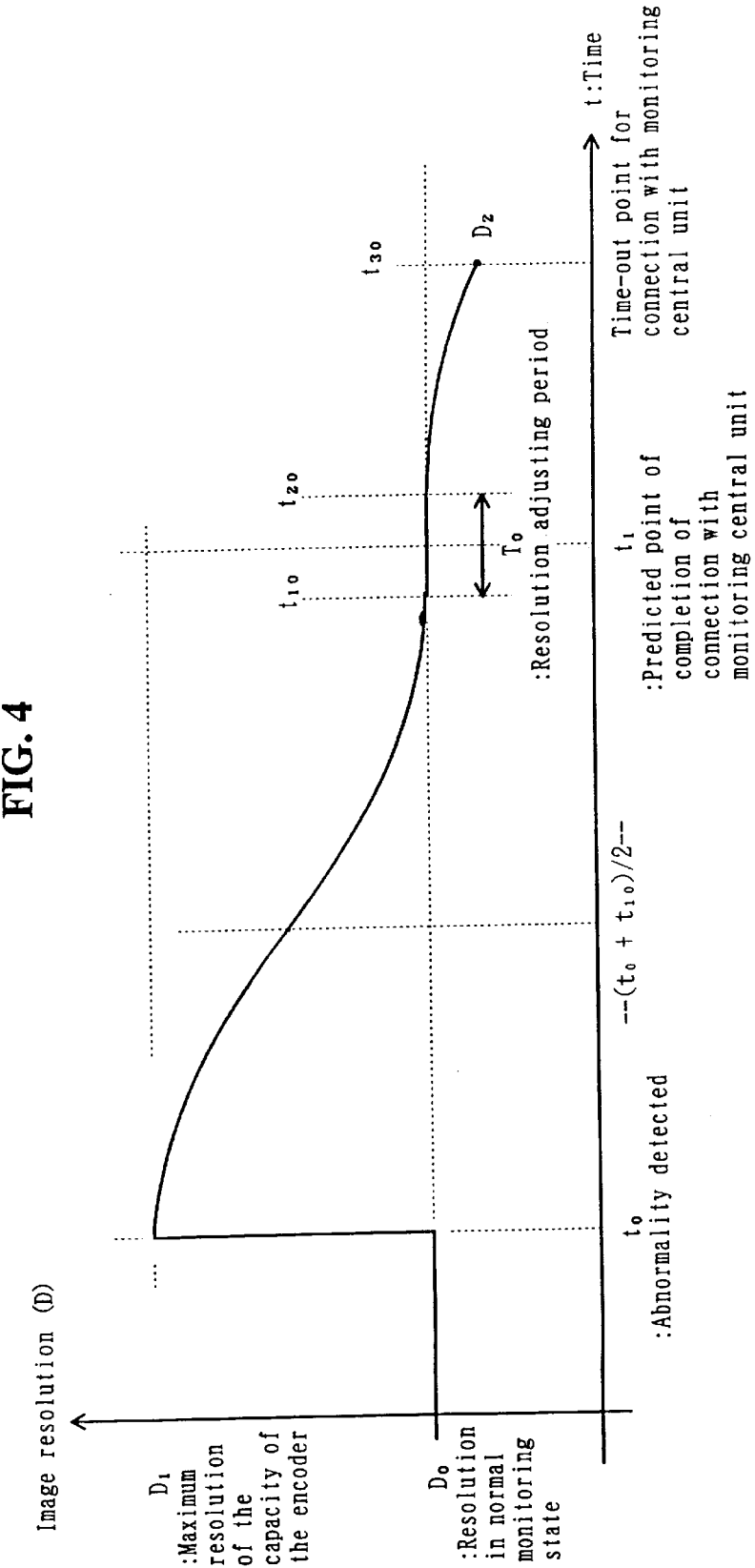
FIG. 4 shows a graph of a change in resolution in encoding image data in still another embodiment of the present invention.
Figure 5:
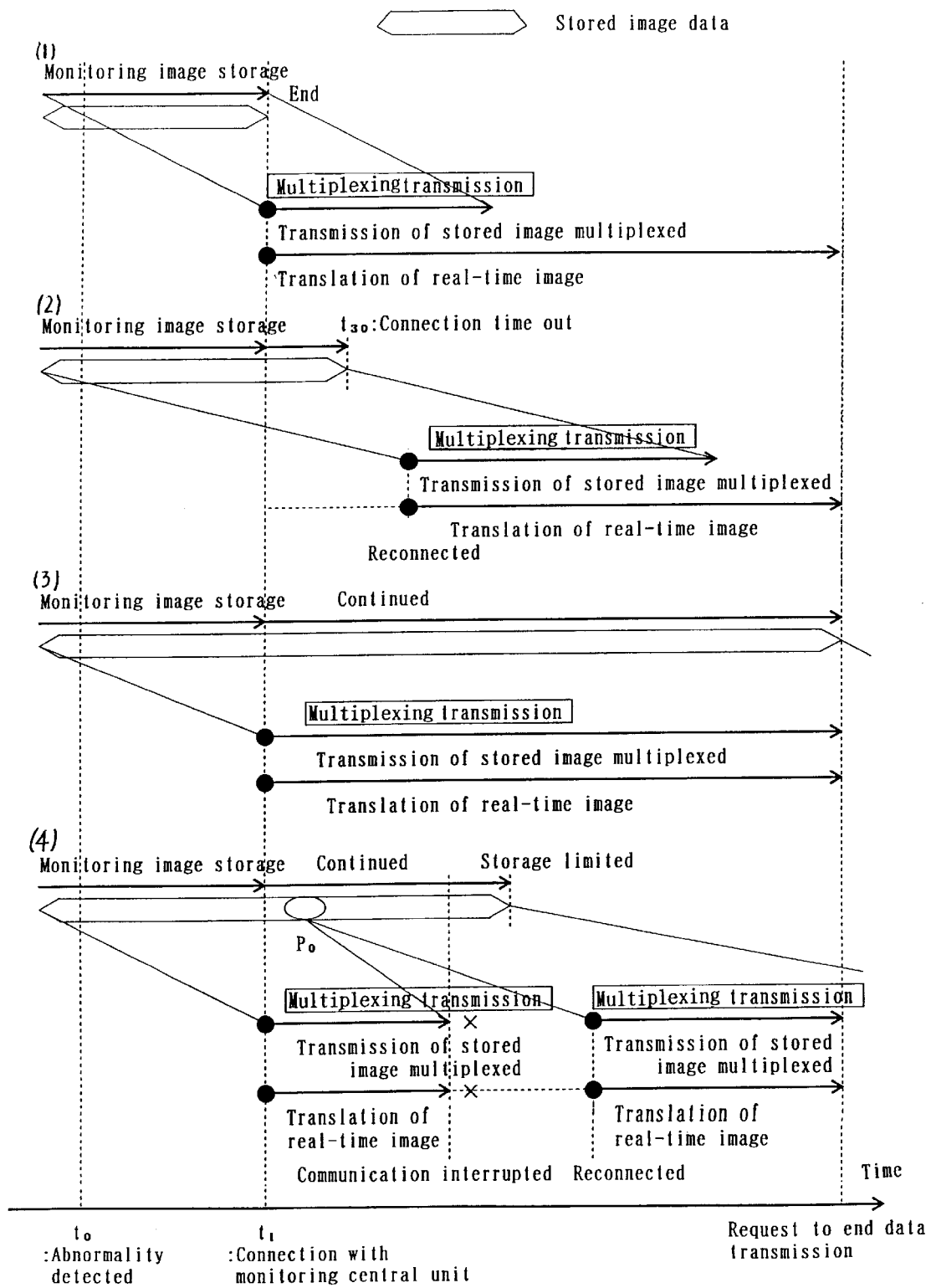
FIG. 5 shows a diagram illustrating image storing process and transmission process in an embodiment of the present invention.
Figure 6:
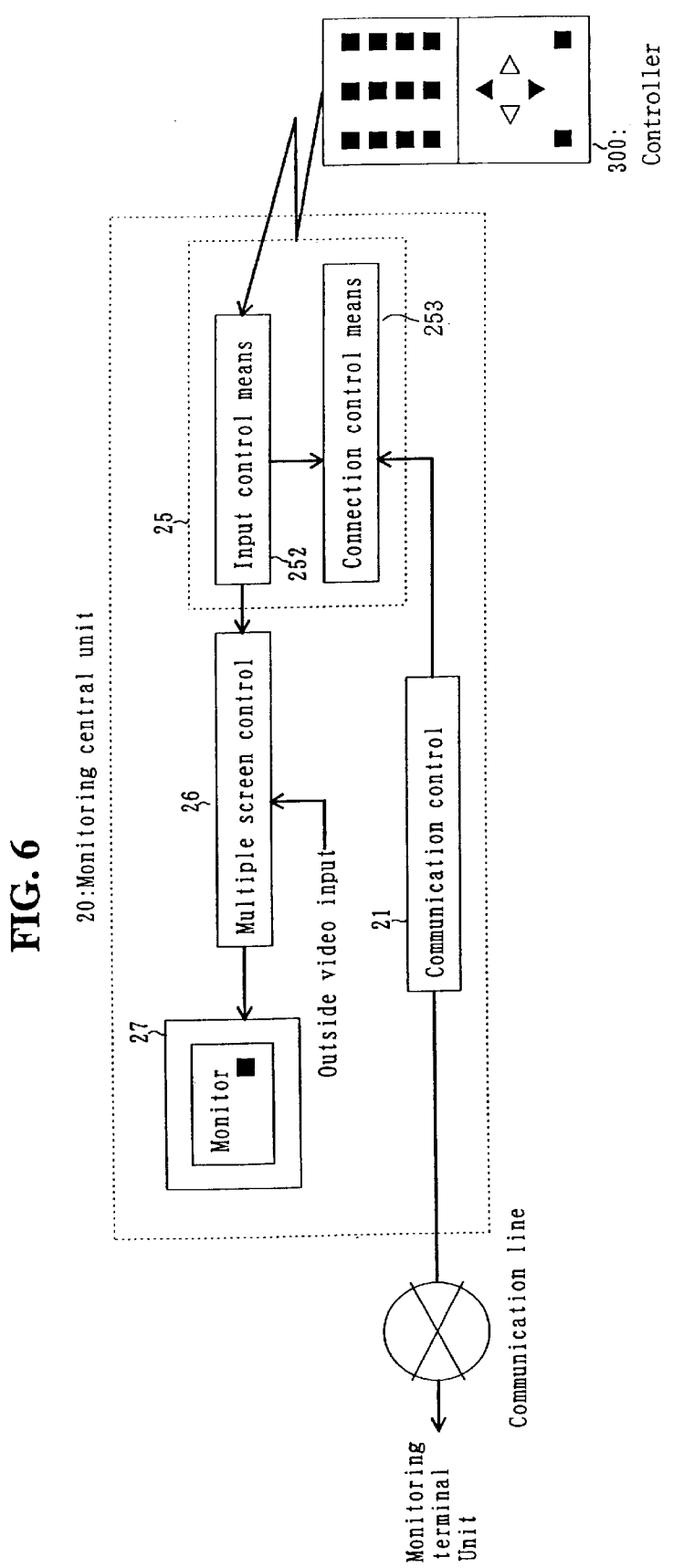
FIG. 6 shows a part of the block diagram of the monitoring central unit shown in FIG. 1.
Figure 7:
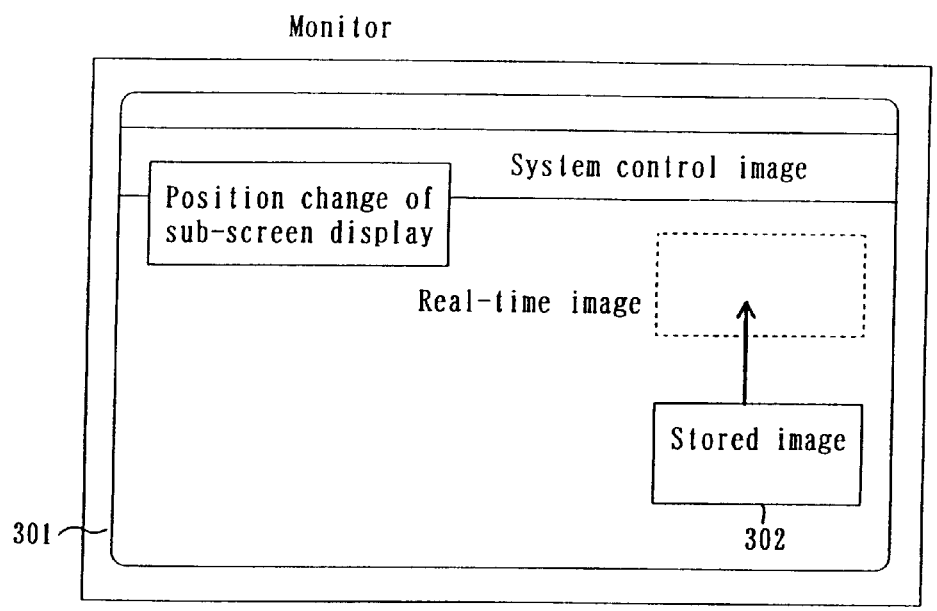
FIGS. 7(a)–7(c) shows monitor screens as examples to explain the function of monitoring central unit shown in FIG. 6.

Now, the configuration and operation of the present invention will be explained with reference to FIG. 1 showing the makeup of a remote monitoring system example according to the present invention, FIG. 2, FIG. 3 and FIG. 4 depicting resolution changes in image encoding with graphs, FIG. 5 illustrating the image storing processes and transmission processes and FIG. 6 and FIG. 7 showing part of the configuration of a monitoring central unit and monitor screen makeup examples.

As in the prior art, a TV camera 11 outputs monitoring images of the object while a sensor 17 watches out for abnormalities in the monitoring object in the remote monitoring system of the present invention. In case of abnormality, there will be transmitted to the monitoring central unit 20 either or both of real-time image data from the encoder 12 or delayed image data stored in the image storage 14. In the present invention, a terminal control 13 controls the resolution before and after the occurrence of abnormality. It is also so arranged that the data multiplexer 15 multiplexes and transmits the real-time image data and delayed image data to the monitoring central unit 20.

As will be explained, the terminal control 13 in the monitoring terminal unit 10 comprises a memory control means 131, a connection control means 132 and an encoding control means 133. The memory control means 131 directs the image storage 14 to store and read out image data. The connection control means 132 instructs a communication control 16 to connect or disconnect the communication line. The encoding control means 133 gives to the encoder 12 a resolution according to the current condition. It is noted that in case the monitoring object is in a normal condition, the resolution in the encoder 12 is set to a lower level than in abnormality.

The monitoring image on the TV camera 11 is encoded at the encoder 12 according to a specific resolution and frames (number of frames per second) given by the encoding control means 133 in the terminal control 13. The monitoring image data thus encoded is stored in the image storage 14, in the normal state, in a normal cyclic manner. In the normal state, therefore, image data is stored in the image storage 14 in a volume determined by the capacity of the image storage 14 and the resolution.

In case the sensor 17 detects an abnormality, the connection control means 132 in the terminal control 13 directs the communication control 16 to establish a connection with the monitoring central unit 20. The abnormality signal is also inputted in the encoding control means 133. Then, the resolution D set in the encoding control means 133 is switched from the normal resolution $D_0$ to a higher resolution $D_1$.

Upon establishing communication with the monitoring central unit 20 in accordance with instructions from the connection control means 132, the communication control 16 informs the same means to the effect. So informed, the connection control means 132 directs the memory control means 131 to read out image data from the image storage 14. At the same time, the connection control means 132 instructs the data multiplexer 15 to multiplex the encoded data from the encoder 12 and stored image data from the image storage 14.

In the memory control 131, a specific point of time before the occurrence of abnormality is preset. Thus, it is possible to multiplex and transmit real-time images from the encoder 12 and image data stored from that point of time before the moment $t_0$ of detection of abnormality. Needless to say, the point of time set in the memory control means 131 may be at the moment of occurrence of abnormality or a certain time after that.

The reason why the resolution will be raised is the need to make the picture of the monitoring object clearer and more vivid after the occurrence of abnormality. While it is desired that the raised resolution should be maintained for a long time, that will increase the image data size per frame. To keep the resolution at a high level for a long time, the image storage 14 must have a large capacity for that. This means an increased cost. After all, the period of keeping the resolution higher is determined in consideration of the capacity of the image storage 14.

Meanwhile, real-time image data begin to be transmitted as the communication control 16 establishes communication with the monitoring central unit 20. But if this real-time image is to be transmitted in the resolution brought back to the normal-state resolution $D_0$, it will be necessary to bring down to the resolution $D_0$ for real-time image the resolution raised to $D_1$ during the time from the occurrence of abnormality to the establishment of communication by the communication control 16. So, it is so arranged that the resolution raised at the moment of occurrence of abnormality and set in the encoder 12 will be gradually lowered to the real-time image resolution (normal-state resolution) $D_0$ a little before the predicted point of completion of connection as shown in FIG. 2.

It is also so configured that a specific period with the predicted point of completion of connection $t_1$ in between is set up as resolution adjusting period $T_0$ (starting point $t_{10}$, final point $t_{20}$) and thus maintained at the same level as the real-time image resolution. Thus, if the establishment of communication pr connection with the monitoring central unit 20 will be completed within the resolution adjusting period $T_0$.

There are a number of possible formulas for bringing down the raised resolution $D_1$ back to the normal-sate resolution $D_0$ as set forth above. Among them is a table indicating the relation between the available capacity of the image storage 14 and the resolution D as Table 1, which is registered with the encoding control means 133 to lower the resolution as in FIG. 2. And the encoding control means 133 constantly checks the remaining capacity in the image storage 14; each time data equivalent to one frame is stored, the resolution D will be updated in relation to the remaining capacity in the image storage 14. The maximum resolution in the capacity of the encoder is shown in Table 1 is 100.

TABLE 1

| Available capacity | Resolution D |
|---|---|
| ~50% | 100 |
| ~45% | 90 |
| ~40% | 80 |
| . | . |

Another feasible formula is specific equations. The time required from the moment to of detection of abnormality to the predicted point $t_1$ of completion of connection is known in advance, and if the specific equations are registered with the encoding control means 133 in advance, the current resolution can be figured out by calculation. For example, it can be so arranged that the resolution D will go down linearly from the moment to of occurrence of abnormality toward the starting point $t_{10}$ of the resolution adjusting period $T_0$ as shown in FIG. 3.

Equation 1  $D = -\dfrac{(D_1 - D_0)(t - t_0)}{(t_{10} - t_0)} + D_1$ (1)

Equation 2  $D = -\dfrac{(D_0 - D_2)(t - t_{20})}{(t_{30} - t_{20})} + D_0$ (2)

Based on formulas $t_0 \leq t \leq t_{10}$ (1)

$t_{20} \leq t \leq t_{30}$ (2)

In another example as shown in FIG. 4, equations (3), (4) and (5) for different parts of the time passage are applied.

Equation 3  $D = \dfrac{2(D_0 - D_1)(t - t_0)^2}{(t_0 - t_{10})^2} + D_1$ (3)

Equation 4  $D = \dfrac{2(D_1 - D_0)(t - t_{10})^2}{(t_0 - t_{10})^2} + D_0$ (4)

Equation 5  $D = \dfrac{(D_2 - D_0)(t - t_{20})^2}{(t_{20} - t_{30})^2} + D_0$ (5)

Based on formulas $t_0 \leq t \leq (t_0 + t_{10})/2$ (1)

$(t_0 + t_{10})/2 \leq t \leq t_{10}$ (2)

$t_{20} \leq t \leq t_{30}$ (3)

The process after the lapse of the resolution adjusting period $T_0$ in FIGS. 2, 3 and 4 will be described later.

Once the communication is established, the storing of image data on in the image storage 14 may be suspended. In this case, what is stored in the image storage 14 can be transmitted to the monitoring central unit 20 repeatedly on demand from the same unit (see FIG. 5-(1)). In case the storing of image data in the image storage 14 is not suspended after communication is established, the time-delayed image data from the moment of occurrence of abnormality up to the moment of establishment of communication will be transmitted along with real-time image data (see FIG. 5-(3)).

Even in the above case, there is a possibility that the connection will be interrupted because of trouble with the communication line or the like. At such a time, the communication control 16 informs the connection control means 132 of the break of the line, and the connection control means 132 in turn notifies the memory control means 131 to the effect. Then, the memory control means 131 retains the time of the break (or the pointer of the image storage 14) and at the same time writes in the image data up to the capacity of the image storage 14 while suspending the writing in of image data after that.

When the connection is resumed after the writing in of image data in the image storage 14 is suspended, the communication control 16 will notify the connection control means 132 of the resumption of communication. And the connection control means 132 informs the memory control means 131 to the effect. The memory control means 131 then reads out the stored image data retained as mentioned above for the period of failure of the line (or pointer) successively and refers the same to the data multiplexer 15 (see FIG. 5-(4)). If the connection is resumed before the writing in of image data in the image storage 14 is suspended (when the capacity of the storage 14 is still available), the read-out of image data will be resumed from the moment of suspension while the writing in of image data continues.

Furthermore, it is so arranged that in case the connection can not be restored before the predicted point $t_1$ of completion of connection, the communication control 16 notifies the connection control means 132 to the effect. Then, the connection control means 132 instructs the image storage 14 to continue writing in image data. While the resolution in the encoder 12 may be the normal-state level set at the predicted point $t_1$ of completion of connection, the writing in of image data can be prolonged within the capacity of the image storage 14 if the resolution is further lowered.

In case connection can not be made with the monitoring central unit 20 before the preset connection time-out point $t_{30}$, the communication control 16 informs the connection control means 132 to the effect. Receiving the notification, the connection control means 132 instructs the communication control 16 after a preset time interval to make a connection with the monitoring central unit 20 again, and the communication control 16 attempts to get a connection. This way, if no connection can be obtained, another attempt will be made. This process is repeated a preset number of times.

In case a connection is made in the re-connecting process, stored image data in the image storage 14 is read out from a specific point before or after the moment $t_0$ of detection of abnormality and is multiplexed with real-time image data in the data multiplexer 15 before being sent out to the monitoring central unit 20 (see FIG. 5-(2)).

Both or either of the stored image data and real-time image data sent in from the monitoring terminal unit 10 to the monitoring central unit 20 is inputted in the data separator 22 via the communication control 21 in the monitoring central unit 20. There, the real-time image data and the stored image data are separated and stored in a real-time image holding means 23a and a stored image holding means 23b respectively. The two holding means 23a and 23b form the image storage. The real-time image data thus stored in the real-time image holding means 23a is read out by the memory control means 251 and inputted in the real-time image decoding means 24a in the decoder 24, where the data is decoded and displayed on the monitor 27 via a multiple screen control 26. The stored image data stored in the stored image holding means 23b is read out by the memory control means 251 and inputted in a stored image decoding means 24b. There, the data is decoded and displayed on the monitor 27 via the multiple screen control 26.

It goes without saying that the stored image and real-time image data can be displayed simultaneously and that in case the storing of image in the image storage 14 is suspended on the side of the monitoring terminal unit simultaneously with the connection of the communication line, it will be possible to get a time-wise continuous stream of monitoring image data if the stored data stored in the stored image holding means 23b and the data stored in the real-time image holding means 23a are read out and so controlled in the memory control means 251 in the monitoring central unit 20 that both data are put together and made time-wise continuous.

The multiple screen control 26 can make a simultaneously multiple display on the monitor 27 of the aforesaid stored image, real-time image, continuous stream of images, system control images or setting the system as, for example, selecting the makeup of the screen, other images from an outside system as a video system. It is also possible to change or switch the screen makeup as display position, display size and the number of display screens on the basis of the system control image according to the control information inputted in the input control means 252.

Figure 7B:
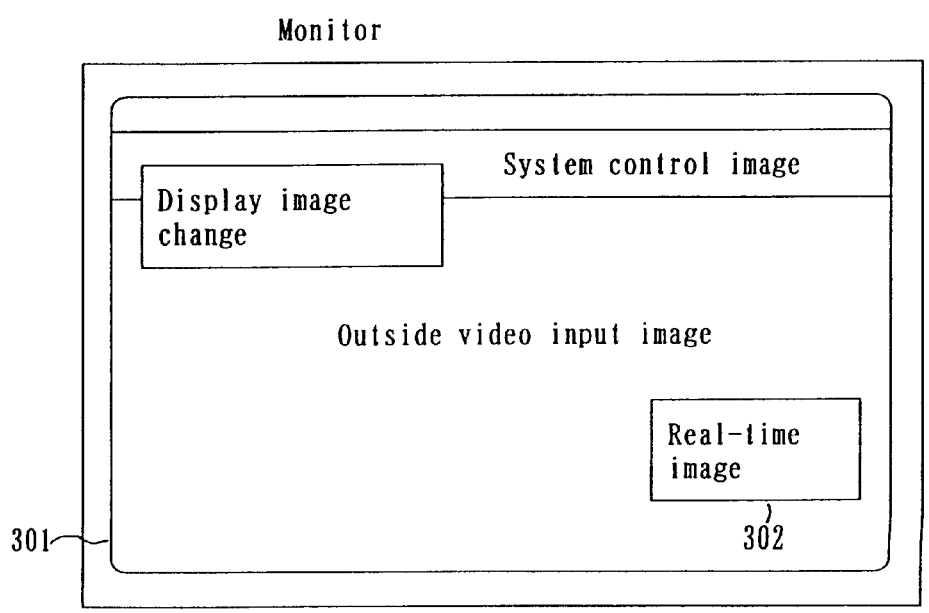

To illustrate the aforesaid function more elaborately, essential parts are cut away from the block diagram in FIG. 1 and are drawn with some picture makeup examples in FIG. 6. The aforesaid control information is inputted from a controller 300. The inputted control information is analyzed in the input control means 252. On the basis of the analysis results, necessary instructions are given to the multiple screen control 26 so that the makeup of the screen is changed or switched. FIG. 7(a), for example, shows a picture for "changing the position of sub-screens." That is, the position of the sub-screen 302 is changed from the place indicated by solid line to the dotted line area in the screen 301 for real-time images. FIG. 7(b) shows "a change in image display." In the main screen 301, the real-time image display shown in FIG. 7(a) is changed to an outside video input image while the sub-screen 302 is switched from the stored image to the real-time image.

Those changes or switches can be effected in the resolution of image, number of frames etc. in the monitoring terminal unit 10. Control or display information such as the resolution of image and number of frames in the monitoring terminal unit 10 is inputted from the input control means 252. Then, the communication control 21 is directed via the connection control means 253 to transmit the inputted control information to the monitoring terminal unit 10. In the monitoring terminal unit 10, the transmitted control or display information is conveyed from the communication control 16 to the connection control means 132, and then on to the encoding control means 133. The encoding control means 133 changes the resolution of image, number of frames etc. according to the control or display information.

Figure 7C:
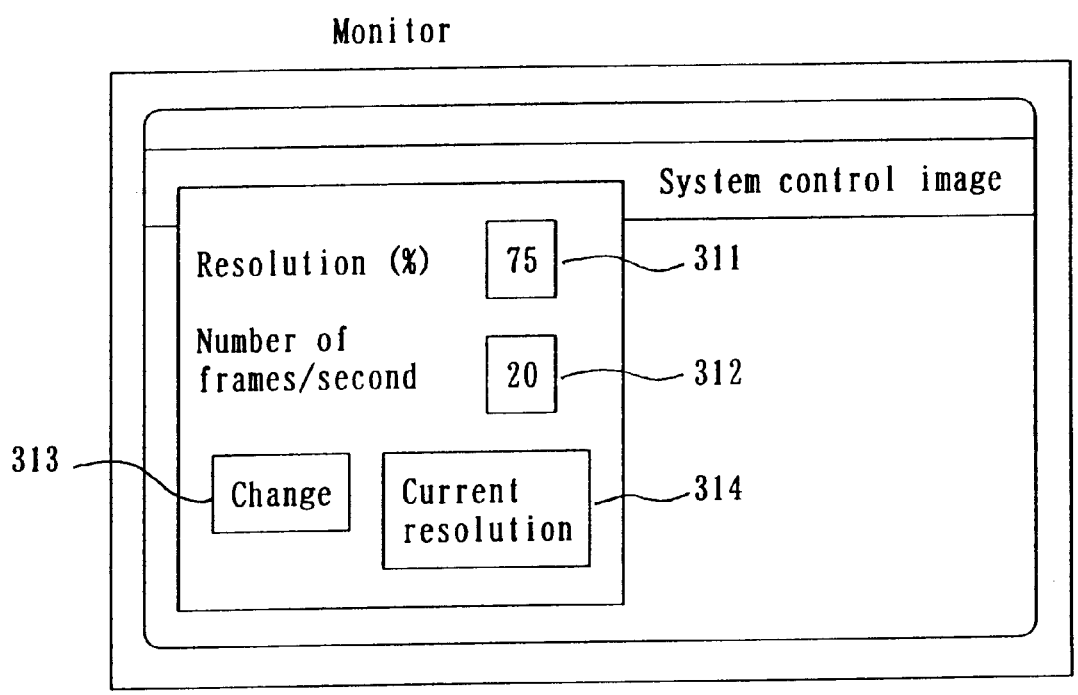
Figure 8:
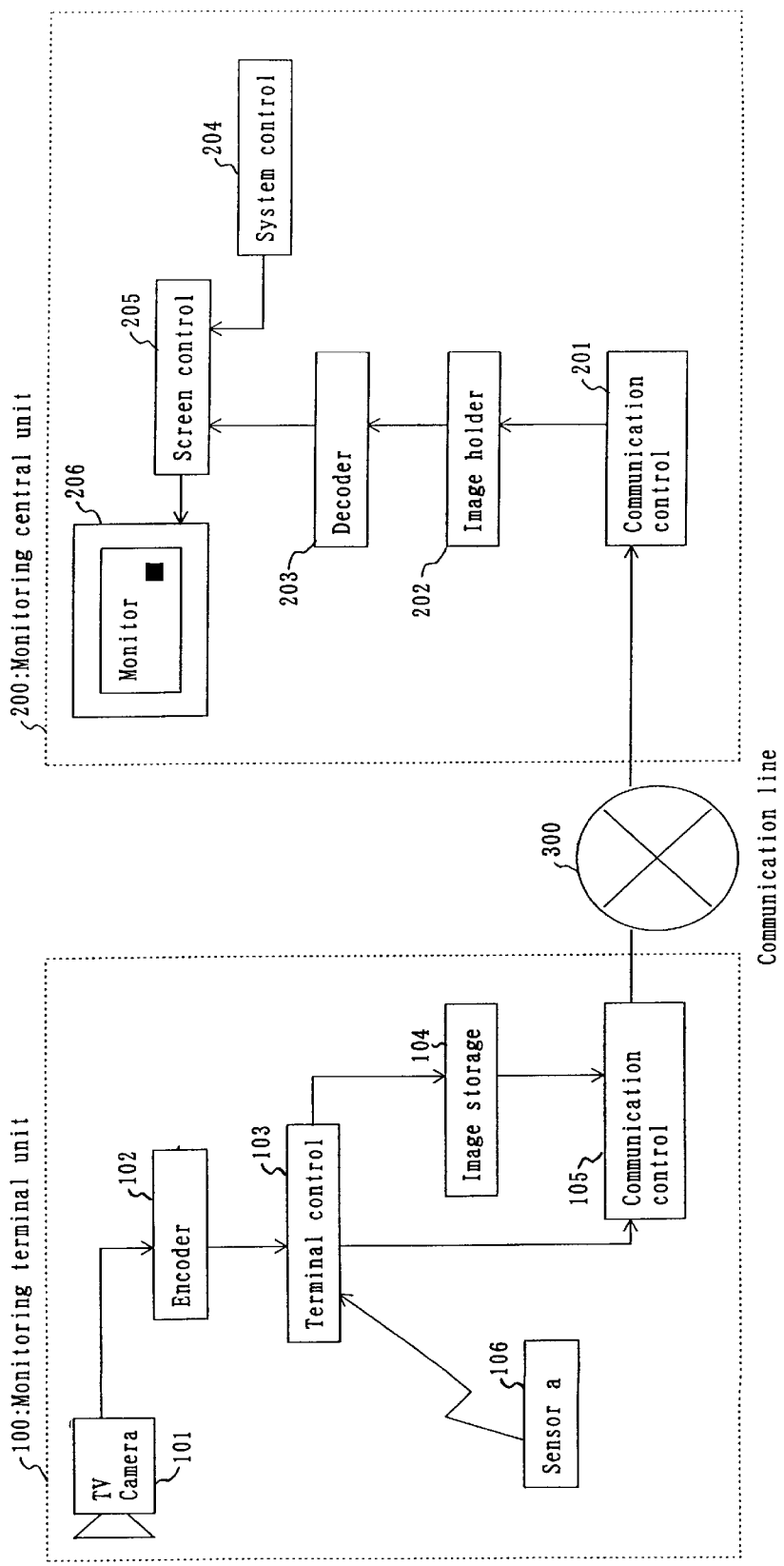
FIG. 8 shows a block diagram of the prior art remote monitoring system.

The aforesaid process will be explained with reference to FIG. 6 and FIG. 7(c). Control information for those changes is inputted through the controller 300. In FIG. 7(c), for example, the resolution (%) and the number of frames per second are then displayed. If "current resolution" is selected on the controller 300, then the resolution (%) and the number of frames per second now set in the encoding control means 133 in the monitoring terminal unit 10 will be acquired for the monitoring central unit 20 through the communication controls 16 and 21 and will be shown in the respective display boxes 311 and 312. After checking the display, the operator inputs new values in those display boxes 311 and 312 through the controller 300. If a "change" 313 is then selected, the connection control means 253 in the system control 25 conveys the information inputted in the boxes 311 and 312 to the monitoring terminal unit 10 through the communication controls 21 and 16. In the monitoring terminal unit 10, the received instructions are set in the encoding control means 133 through the connection control 132.

In the present invention, as set forth above, important images in the initial stage of occurrence of abnormality can be obtained by storing monitoring image data with the image resolution changed in the monitoring terminal unit. It is also possible to simultaneously display on the monitor in the monitoring central unit the stored image and real-time image by multiplexed transmission of the stored image data and real-time image data in the monitoring terminal unit. Furthermore, through multiple screen display, the monitoring central unit permits the tracing of the cause of abnormality while the current condition is constantly followed. Thus, the present invention materializes an excellent remote monitoring system which allows effective monitoring.

It is to be understood that the various means and functions described in the embodiments of the present invention may be formed or configured as either software or hardware.

While the invention has been described with reference to preferred embodiments thereof, it is also to be understood that modifications or variations may be easily made without departing from the spirit or the scope of the present invention.

What is claimed is:

1. A remote monitoring system comprising;
   a monitoring terminal unit provided with a TV camera to picture a monitoring object,
   a sensor to watch for an abnormality in the monitoring object, an encoder to encode the monitoring image from said TV camera in a set resolution,
   an image storage to write in the encoded image data in a continuous and cyclic manner and
   a connection control means to control connection for communication, and a remotely located monitoring central unit which will be connected with said monitoring terminal unit by said connection control means through a communication line in case said sensor detects an abnormality so that real-time images on said TV camera or stored images will be transmitted and displayed on a monitor in the monitoring central unit, and
   an encoding control means for setting the resolution of said encoder to a fixed level in the normal state and to a value higher than the fixed level when an abnormality is detected.

2. The remote monitoring system as defined in claim 1, wherein
   said encoding control means gradually lowers the resolution of said encoder established in said case of detection of an abnormality down to the level of resolution for real-time images which are transmitted after establishment of connection with said monitoring central unit in such a way that reaching said level of resolution is timed to the predicted point of completion of connection preset in said connection control means.

3. The remote monitoring system as defined in claim 2, wherein
   in case the connection between said monitoring terminal unit and said monitoring central unit can not be established before the passage of a certain period of time during which completion of connection is predicted, that is, a resolution adjusting period in which the resolution is maintained at the same level as that for said real-time images, said encoding control means gradually lowers the resolution from the resolution level for said real-time images until the connection time-out point preset in said connection control means at which point the attempt to connect with the monitoring central unit will be regarded as failure and at the same time the writing in of image data continues until said time-out point as long as the capacity of said image storage remains available.

4. The remote monitoring system as defined in claim 1, wherein
   said connection control means is provided with a function that reattempts to establish a connection with said monitoring central unit in case an attempt to get a connection with said monitoring central unit fails, said reattempting repeated a preset number of times at a preset interval.

5. The remote monitoring system as defined in claim 1, wherein
   said monitoring terminal unit is provided with a data multiplexer for multiplexing the real-time image data outputted by said encoder and the stored image data from said image storage,
   and said monitoring central unit is provided with a data separator to separate multiplexed image data sent in from said monitoring terminal unit,
   an image storage to store real-time image data and stored image data outputted from said data separator respectively,
   an image decoder to decode the respective outputted data from said image storage and
   a multiple screen control to so control the display as to display on the monitor said real-time image and said stored image simultaneously or separately.

6. The remote monitoring system as defined in claim 5 wherein
   said monitoring terminal unit is provided with a memory control means to control the readout of image data and said memory control means reproduces a stream of monitoring images by putting together said stored image data stored in said image storage and said real-time image data.

7. The remote monitoring system as defined in claim 5, wherein
   said multiple screen control simultaneously displays on the monitor a stream of monitoring images, system control images for changing the setting of the system, and makes a change or switch-over in the makeup of monitor screen including display position, display size and number of display screens.

8. The remote monitoring system as defined in claim 5, wherein
   said monitoring central unit is provided with an input control means to input control information for changing the resolution of said monitoring terminal unit.

9. The remote monitoring system as defined in claim 1, wherein
   said monitoring terminal unit is provided with a memory control means to control the writing in of image data in said image storage and the read-out of said image data therefrom and at the same time said memory control means reads out and transmits the stored image data from said image storage from the point of completion of connection by said connection control means.

10. The remote monitoring system as defined in claim 9, wherein a specific period before or after the moment of detection of abnormality is set in said memory control means and when said stored image data is read out from said image storage, said stored image data for said set period is read out.

11. The remote monitoring system as defined in claim 9, wherein
    said memory control means finishes writing image data in said image storage when the connection with said monitoring central unit is completed and can transmit said stored image data repeatedly as demanded by said monitoring central unit.

12. The remote monitoring system as defined in claim 9, wherein
    said memory control means continues writing image data in said image storage even after the connection with said monitoring central unit is completed and can transmit image data from said image storage as delayed image data along with said real-time image data.

13. The remote monitoring system as defined in claim 12, wherein
    when the communication between said monitoring terminal unit and said monitoring central unit is resumed after an interruption, said memory control means will transmit said stored image data from a point before or after the moment of interruption of communication along with the real-time image.

14. A remote monitoring method which comprises, in a monitoring terminal unit, having a TV camera picture a monitoring object and a sensor watch out for any abnormality in said monitoring object, encoding the monitoring images from said TV camera in a set resolution and writing said encoded images in an image storage in a continuous and cyclic manner, and in case of detection of an abnormality by the sensor, connecting said monitoring terminal unit with a monitoring central unit and displaying on a monitor in said monitoring central unit real-time images by said TV camera and stored images sent in from said monitoring terminal unit, the resolution for images to be encoded being fixed at a constant value in the normal state and raised from the normal-state value in case of abnormality.

15. The remote monitoring method as defined in claim 14, wherein the resolution raised for images to be encoded in said case of detection of an abnormality is gradually lowered down to the level of resolution for real-time images which are transmitted after establishment of connection with said monitoring central unit in such a way that reaching said level of resolution is timed to the preset predicted point of completion of connection.

16. The remote monitoring method as defined in claim 15, wherein in case the connection between said monitoring terminal unit and said monitoring central unit can not be established before the passage of a certain period of time during which completion of connection is predicted, that is, a resolution adjusting period in which the resolution is maintained at the same level as that for said real-time images, then said resolution is gradually lowered from the resolution level for said real-time images until the preset connection time-out point at which point the attempt to connect with the monitoring central unit will be regarded as failure and at the same time the writing in of image data is continued until said time-out point as long as the capacity of said image storage remains available.

* * * * *

UNITED STATES PATENT AND TRADEMARK OFFICE
CERTIFICATE OF CORRECTION

PATENT NO. : 6,172,605 B1
DATED : January 9, 2001
INVENTOR(S) : Takashi Matsumoto, et al.

It is certified that error appears in the above-identified patent and that said Letters Patent is hereby corrected as shown below:

<u>Column 6,</u>
Line 28, at the beginning of the formula (2), insert -- ( -- before "$t_0 + t_1$)" --

Signed and Sealed this

Twenty-third Day of October, 2001

Attest:

NICHOLAS P. GODICI
*Attesting Officer*    *Acting Director of the United States Patent and Trademark Office*